(12) United States Patent
Trishkin et al.

(10) Patent No.: US 7,491,033 B2
(45) Date of Patent: Feb. 17, 2009

(54) FLUID FLOW MACHINE BLADE

(75) Inventors: Alexander Trishkin, Lytkarino (RU); Vladimir Vassiliev, Turgi (CH); Dmitri Vinogradov, Moscow (RU)

(73) Assignee: ALSTOM Technology Ltd., Baden (CH)

( * ) Notice: Subject to any disclaimer, the term of this patent is extended or adjusted under 35 U.S.C. 154(b) by 0 days.

(21) Appl. No.: 11/556,251

(22) Filed: Nov. 3, 2006

(65) Prior Publication Data
US 2007/0148003 A1 Jun. 28, 2007

Related U.S. Application Data

(63) Continuation of application No. PCT/EP2005/052035, filed on May 4, 2005.

(30) Foreign Application Priority Data
May 10, 2004 (DE) ........................ 10 2004 023 623

(51) Int. Cl.
F01D 5/08 (2006.01)
(52) U.S. Cl. .............................. 416/241 R; 416/241 B; 416/97 R; 416/193 A; 29/889.721
(58) Field of Classification Search ............... 416/96 R, 416/97 R, 193 A, 189, 241 R, 241 B
See application file for complete search history.

(56) References Cited

U.S. PATENT DOCUMENTS

| | | | |
|---|---|---|---|
| 4,629,397 A | 12/1986 | Schweitzer | |
| 4,904,542 A * | 2/1990 | Mroczkowski | 428/610 |
| 5,209,645 A * | 5/1993 | Kojima et al. | 416/241 B |
| 5,840,434 A | 11/1998 | Kojima et al. | |
| 6,095,755 A * | 8/2000 | Houston | 416/241 R |
| 6,106,231 A * | 8/2000 | Brainch et al. | 416/97 R |
| 6,126,400 A * | 10/2000 | Nichols et al. | 416/241 B |
| 6,197,424 B1 | 3/2001 | Morrison et al. | |
| 6,224,339 B1 | 5/2001 | Rhodes et al. | |
| 6,241,469 B1 | 6/2001 | Beeck et al. | |
| 6,254,756 B1 * | 7/2001 | Maricocchi et al. | 205/97 |
| 6,274,215 B1 * | 8/2001 | Brainch et al. | 428/77 |

FOREIGN PATENT DOCUMENTS

| | | |
|---|---|---|
| DE | 4310896 | 3/1994 |
| WO | WO03/026886 | 4/2003 |
| WO | WO2005/108746 | 11/2005 |

OTHER PUBLICATIONS

Search Report for German Patent App. No. 10 2004 023 623.2 (Jul. 30, 2004).
International Search Report for PCT Patent App. No. PCT/EP2005/052035 (Aug. 5, 2005).
International Preliminary Examination Report for PCT Patent App. No. PCT/EP2005/052035 (Sep. 14, 2006).

* cited by examiner

*Primary Examiner*—Ninh H Nguyen
(74) *Attorney, Agent, or Firm*—Cermak Kenealy Vaidya & Nakajima LLP; Adam J. Cermak

(57) ABSTRACT

A fluid flow machine blade (1) is provided on the outer contour of the airfoil (4) with a thermal barrier coating (41). In this context, quite purposefully, only part-regions of the airfoil have the thermal barrier coating, while well-defined second part-regions of the airfoil (42, 43, 44) are realized purposefully without thermal barrier coating. In particular, along the trailing edge (46) of the airfoil, a region (42) is realized without thermal barrier coating. In further embodiments of the invention, regions of the airfoil (43, 44) which lie adjacent to foot-side (21) or tip (31) platforms of the blades are realized without thermal barrier coating.

23 Claims, 4 Drawing Sheets

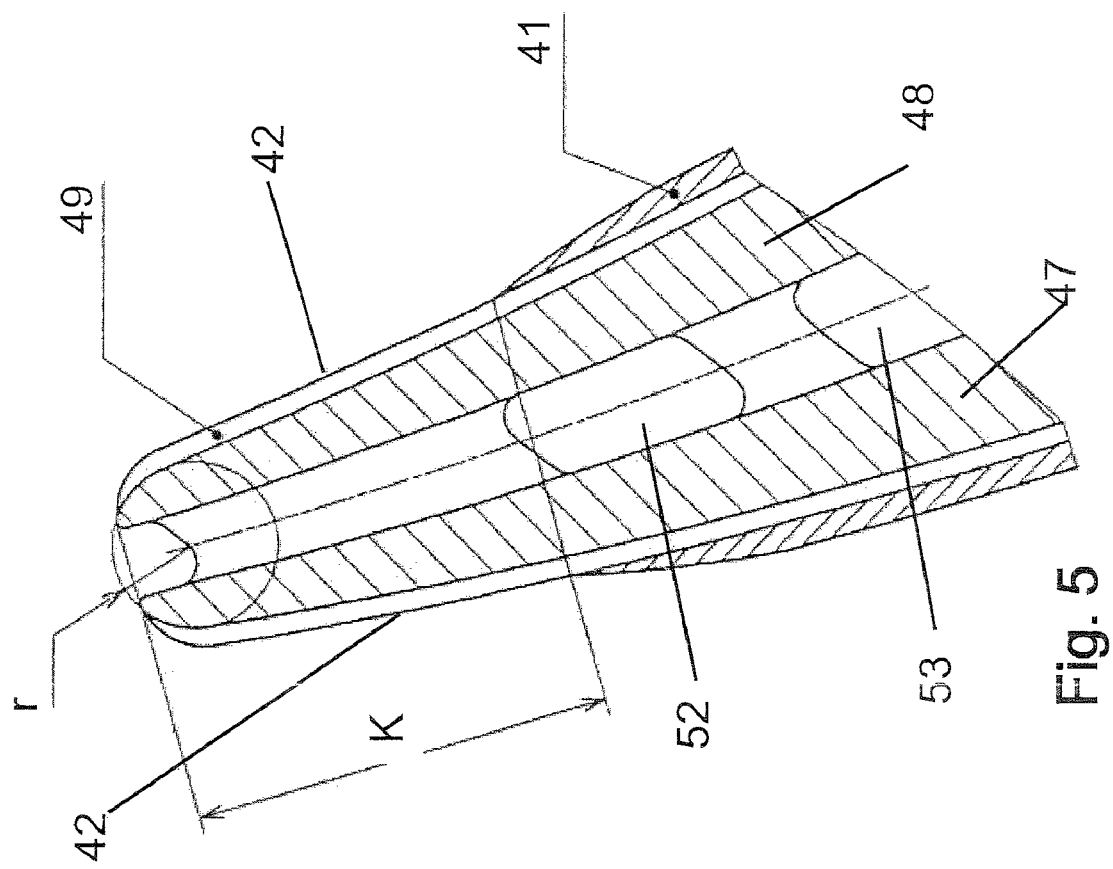
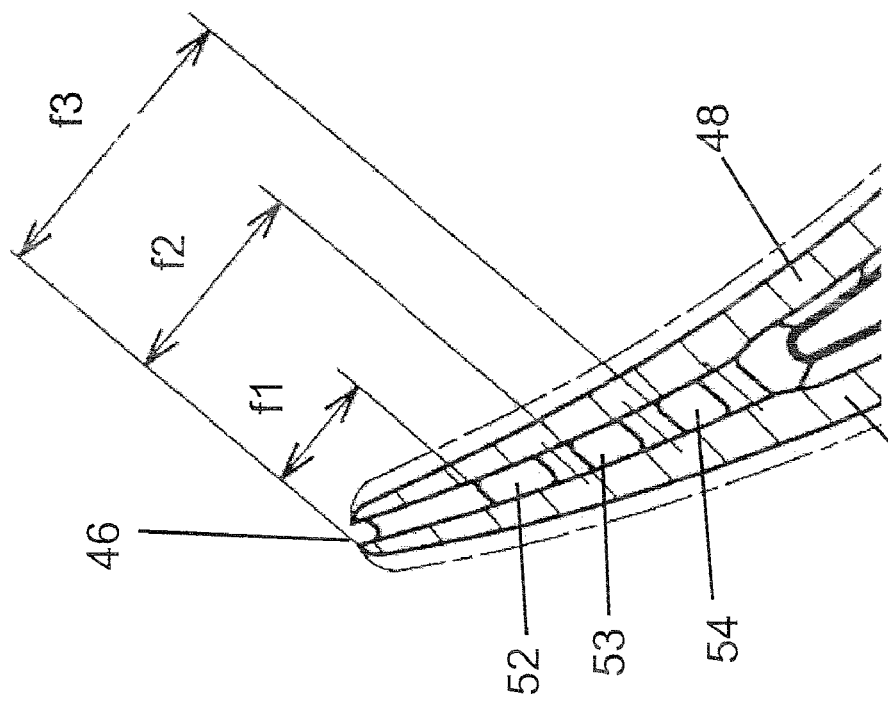

FLUID FLOW MACHINE BLADE

This application is a Continuation of, and claims priority under 35 U.S.C. § 120 to, International patent application number PCT/EP2005/052035, filed 4 May 2005, and claims priority therethrough under 35 U.S.C. § 119 to German patent application number 10 2004 023 623.2, filed 10 May 2004, the entireties of which are incorporated by reference herein.

BACKGROUND OF THE INVENTION

1. Field of the Invention

The present invention relates to a fluid flow machine blade, and further relates to a process for manufacturing a fluid flow machine blade of this kind.

2. Brief Description of the Related Art

In modern fluid flow machines, especially in the hot-gas path of gas turbo sets, very high temperatures prevail. Components which are used there are therefore, on the one hand, cooled and, on the other hand, provided with thermal barrier coatings (TBC) as an alternative or complement. The thermal barrier coatings, which generally include ceramic materials, reduce the heat input into the fluid flow machine components. In order to achieve optimal heat insulation, the components which are flowed around by hot gas are usually provided with the thermal barrier coating on the whole of their contour which is flowed around or flowed over by hot gas. It has been shown, however, that, in addition to the pure thermal loading of the components, there also occur uneven temperature distributions, which give rise to thermal stresses which are detrimental to the service life of a component. It has further been shown that the thermal barrier coatings, on the one hand, increase the friction losses from the circumfluence or flowing-over of the component; furthermore, it has also been shown that, due to the airfoil trailing edge having been made thicker by the thermal barrier coating, the trailing edge losses on turbine blades also rise.

SUMMARY OF THE INVENTION

One of numerous aspects of the present invention includes defining a fluid flow machine blade of the type stated in the introduction, which avoids the drawbacks of the prior art. A fluid flow machine blade according to principles of the present invention is particularly intended to exhibit improved temperature distribution during operation. In addition, a fluid flow machine blade according to the invention is intended to reduce flow losses in comparison to the prior art.

Another aspect of the present invention includes purposefully providing only part-regions of the airfoil with the thermal barrier coating, and to realize other part-regions, which are less subjected to hot gas or which are intensively cooled, either by the flow of a cooling fluid or by heat dissipation to adjacent material, without thermal barrier coating. Basically, aspects of the present invention are based on a fluid flow machine blade having an airfoil whose outer contour is provided with a thermal barrier coating. In a first exemplary embodiment of the invention, the outer contour of the airfoil is provided with a thermal barrier coating, a region adjoining the trailing edge of the airfoil being realized without thermal barrier coating. According to a second exemplary embodiment of the invention, the fluid flow machine blade has at the blade foot a blade platform, the airfoil, in a region adjoining the blade platform, being realized without thermal barrier coating. According to a exemplary third embodiment of the invention, the fluid flow machine blade has in the blade tip region a tip platform, the airfoil, in a region adjoining the tip platform, being realized without thermal barrier coating. Of course, these embodiments can be mutually combined in such a way that there results, for example, a fluid flow machine blade, the airfoil of which has a thermal barrier coating on the outer contour, whereas the trailing edge region, a tip marginal region, and a foot-side marginal region of the airfoil are realized without thermal barrier coating.

The airfoil of the fluid flow machine blade has a chord length which is measured in a straight line from the blade leading edge to the blade trailing edge. The chord length can vary over the airfoil height, which extends from the blade foot to the blade tip. The blade trailing edge does not generally taper perfectly to a point, but ends with a trailing edge radius. In a frequently used construction, the blade contour is formed by a pressure-side wall and a suction-side wall, the pressure-side wall and the suction-side wall enclosing between them a cavity. In the cavity, ducts are then preferably formed for the passage of a cooling fluid, especially of cooling air. In a frequently realized construction, the cavity is open in the region of the airfoil trailing edge such that cooling fluid can flow out through the trailing edge and cool the latter. In order to stabilize the airfoil structure, it is known to dispose in the cavity webs and/or ribs, which connect the suction-side wall and the pressure-side wall one to the other and thereby stabilize them. Such webs and/or ribs are disposed particularly in the region of the airfoil trailing edge.

In the first embodiment of the invention, the thermal barrier coating, in the direction of circumfluence running from the airfoil leading edge to the airfoil trailing edge, ends a distance upstream of the airfoil trailing edge. According to a first variant, this distance is dimensioned such that it is greater than or equal to 10% of the chord length of the airfoil. In a second variant, the distance is dimensioned such that it is less than or equal to 15% of the chord length of the airfoil. The chord length of the airfoil varies frequently over the airfoil height. The thermal barrier coating can here be disposed such that the local ratio of distance to chord length is constant over the whole of the airfoil height. Similarly, the thermal barrier coating can be disposed such that the distance by which the thermal barrier coating ends upstream of the airfoil trailing edge is constant, as an absolute value, over the whole of the airfoil height.

In a third variant of the first embodiment, the distance by which the thermal barrier coating ends upstream of the trailing edge is greater than or equal to five times the trailing edge radius. According to a fourth variant of the first embodiment, the distance by which the thermal barrier coating ends upstream of the trailing edge is less than or equal to eight times the trailing edge radius. In a further variant of the first embodiment, in the cavity formed within the airfoil, there is disposed a first web or a first row of webs having a first distance from the airfoil trailing edge. The distance by which the thermal barrier coating ends upstream of the airfoil trailing edge is greater than or equal to this first distance. According to yet another variant of the first embodiment, in the cavity formed within the airfoil a second web or a second row of webs is disposed at a second distance from the airfoil trailing edge. The distance by which the thermal barrier coating ends upstream of the airfoil trailing edge is less than or equal to the second distance. The defined variants of the first embodiment can be mutually combined.

In the second and the third embodiment of the invention, the transition from the airfoil to the tip platform and to the foot-side blade platform, respectively, is generally realized such that it is rounded-off with a transition radius or with a plurality of transition radii. In a variant of the second embodiment, the width of the region adjacent to the foot-side blade platform which is uncovered by the thermal barrier coating is greater than the transition radius adjoining the foot-side platform. In a variant of the third embodiment, the width of the region adjacent to the tip blade platform which is uncovered by the thermal barrier coating is greater than the transition radius adjoining the tip platform.

Advantageously, on the region of the airfoil which is not covered by the thermal barrier coating, an anti-oxidization layer is applied in such a way that the surface of the airfoil is formed either by the thermal barrier coating or by the anti-oxidization layer. In one embodiment, the anti-oxidization layer covers the entire outer airfoil contour, in which case, in the regions covered by the thermal barrier coating, it is disposed as a bond coat between the blade base material and the thermal barrier coating.

For the manufacture of a fluid flow machine blade according to the invention, a blade basic element is manufactured from a base material, which basic element includes an airfoil having an outer airfoil contour, and on the airfoil outer contour a thermal barrier coating is applied quite purposefully only to well-defined part-regions. In a variant of the manufacturing process, prior to the application of the thermal barrier coating, a bond coat acting as an anti-oxidization layer is applied to the entire airfoil outer contour, following which, on the airfoil outer contour, purposefully in well-defined part-regions, a thermal barrier coating is applied to the bond coat.

Further embodiments of the invention will become apparent to the person skilled in the art in the light of the illustrative embodiments represented below.

BRIEF DESCRIPTION OF THE DRAWINGS

The invention is explained in greater detail below with reference to an illustrative embodiment illustrated in the drawing. In detail:

FIGS. 4 and 5 show detailed representations of the trailing edge of the fluid flow machine blade as represented in FIG. 3.

Essentially, only those features are represented which are critical to an understanding of the invention. The illustrative embodiments are intended to serve a better understanding of the invention and should not be used to limit the invention characterized in the claims.

DETAILED DESCRIPTION OF EXEMPLARY EMBODIMENTS

Figure 1:
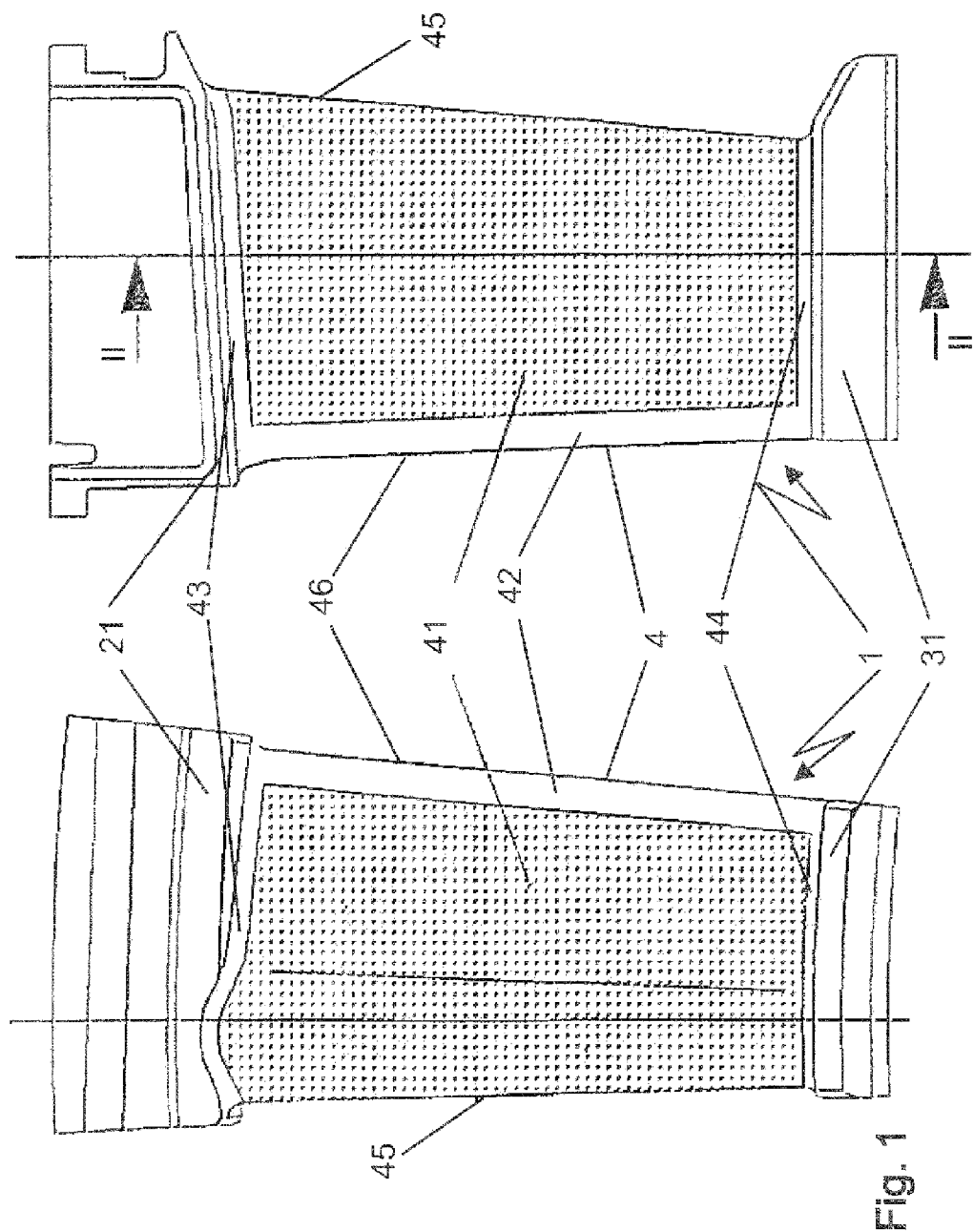
FIG. 1 shows a side view of a fluid flow machine blade according to an exemplary embodiment of the invention.

In FIG. 1, a fluid flow machine blade according to the invention is represented in two side views. The fluid flow machine blade 1 includes an airfoil 4, a blade-foot-side platform 21, and a tip platform 31. The tip platform is, for example, an element of a blade shroud band. The airfoil 4 includes a leading edge 45 and an airfoil trailing edge 46. During operation, the outer contour of the airfoil is flowed around by a hot-gas flow in a direction from the airfoil leading edge 45 to the airfoil trailing edge 46. On the airfoil outer contour, a region 41 is provided with a thermal barrier coating. The region in which the thermal barrier coating 41 is applied to the airfoil, viewed in the direction of circumfluence, ends a distance upstream of the airfoil trailing edge, such that on the airfoil trailing edge there is a region 42 present which is not provided with the thermal barrier coating. In addition, respectively adjacent to the platforms 21 and 31, further regions 43 and 44 of the airfoil are realized without thermal barrier coating. As set out below, enclosed inside the airfoil is a cavity, which is configured for the passage of cooling air. At least a part of the cooling air is blown out at the trailing edge 46 of the airfoil 4. Consequently, the trailing edge region of the airfoil is relatively intensively cooled. In addition, during operation of the gas turbo set in which the fluid flow machine blade is installed, a heat input into the airfoil takes place, whereas the heat input into the platforms 21 and 31 is significantly less. As a result, heat currents are generated from the airfoil toward the platforms. In terms of the net heat balances, the marginal regions of the airfoil which adjoin the platforms and the trailing edge are accordingly less heavily loaded than the rest of the airfoil. This factor is taken into account by the fact that the initially more heavily loaded part of the airfoil is provided with a thermal barrier coating, whereas those marginal regions are realized without thermal barrier coating. Hence, the heat transfer in these marginal regions is higher than in the coated region, thereby compensating for the increased heat dissipation. In total, this leads to an evening-up of the temperature distribution in the airfoil. Accordingly, the invention is thus based on the fact that in regions in which an increased heat dissipation takes place, the heat input is simultaneously increased through the omission of the thermal barrier coating.

Figure 2:
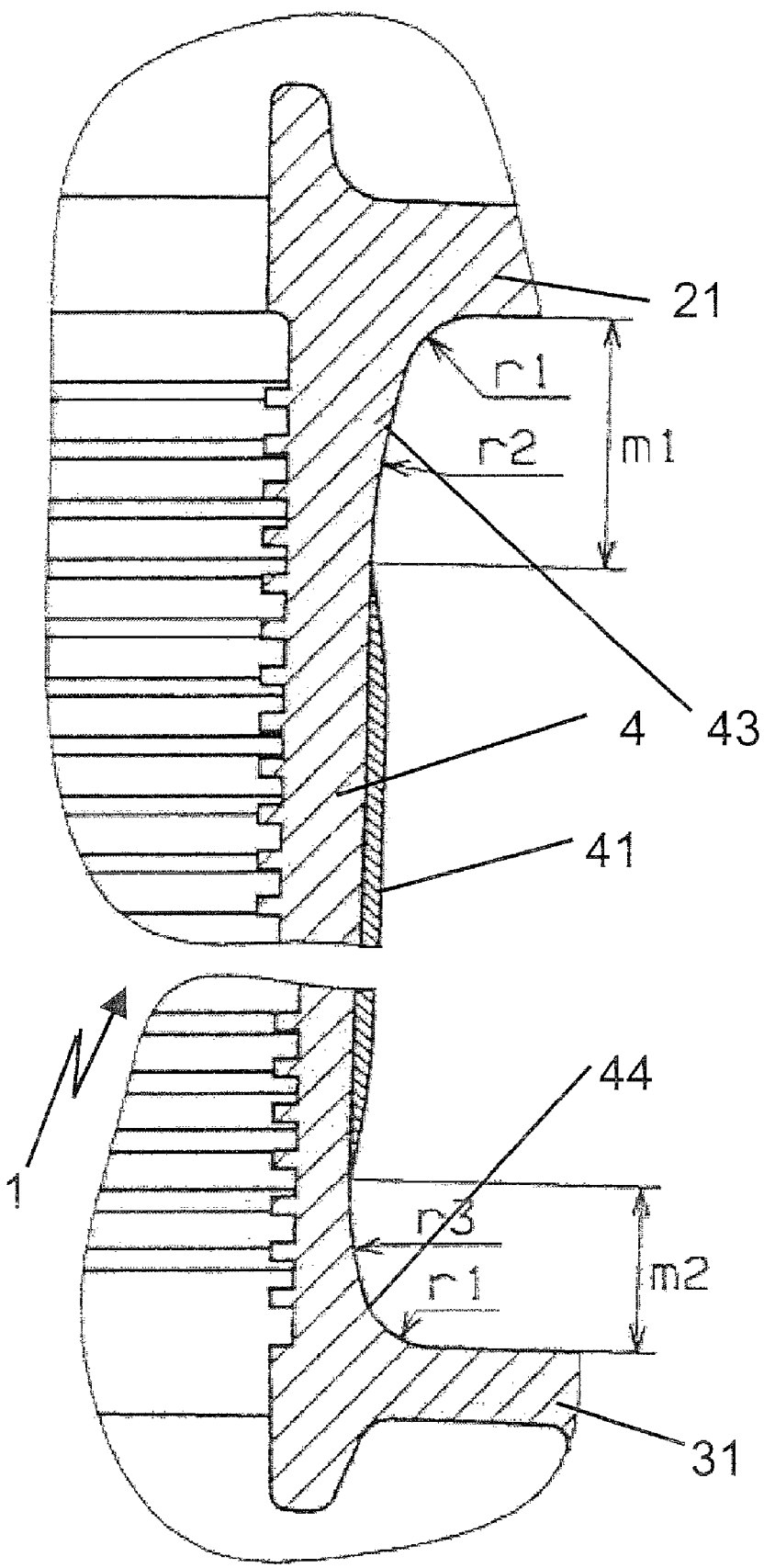
FIG. 2 shows a longitudinal section through the fluid flow machine blade from FIG. 1, along the line labeled II-II.

In FIG. 2, a section through an exemplary fluid flow machine blade according to the invention, along the line II-II represented in FIG. 1, is represented. The transition from the airfoil 4 to the platforms 21 and 31 is effected with roundings. The roundings have different transition radii, the transition radii, directly adjacent to the platforms 21 and 31, having the measure r1. It is by no means imperative for these radii on the tip platform and on the foot-side platform to be identical, as represented. On the outer contour of the airfoil 4, the thermal barrier coating 41 is applied. Adjacent to the platforms 21 and 31, the regions 43 and 44 not covered by the thermal barrier coating are present. The width m1 of the region not covered on the foot side is greater than the transition radius r1 adjoining the foot-side platform 21. The width m2 of the region not covered on the tip side is greater than the transition radius r1 adjoining the tip platform 21. In one embodiment of the invention, the measures m1 and m2 are dimensioned such that the requirement is met: m1>r1+r2/3 and m2>r1+r3/3.

Figure 3:
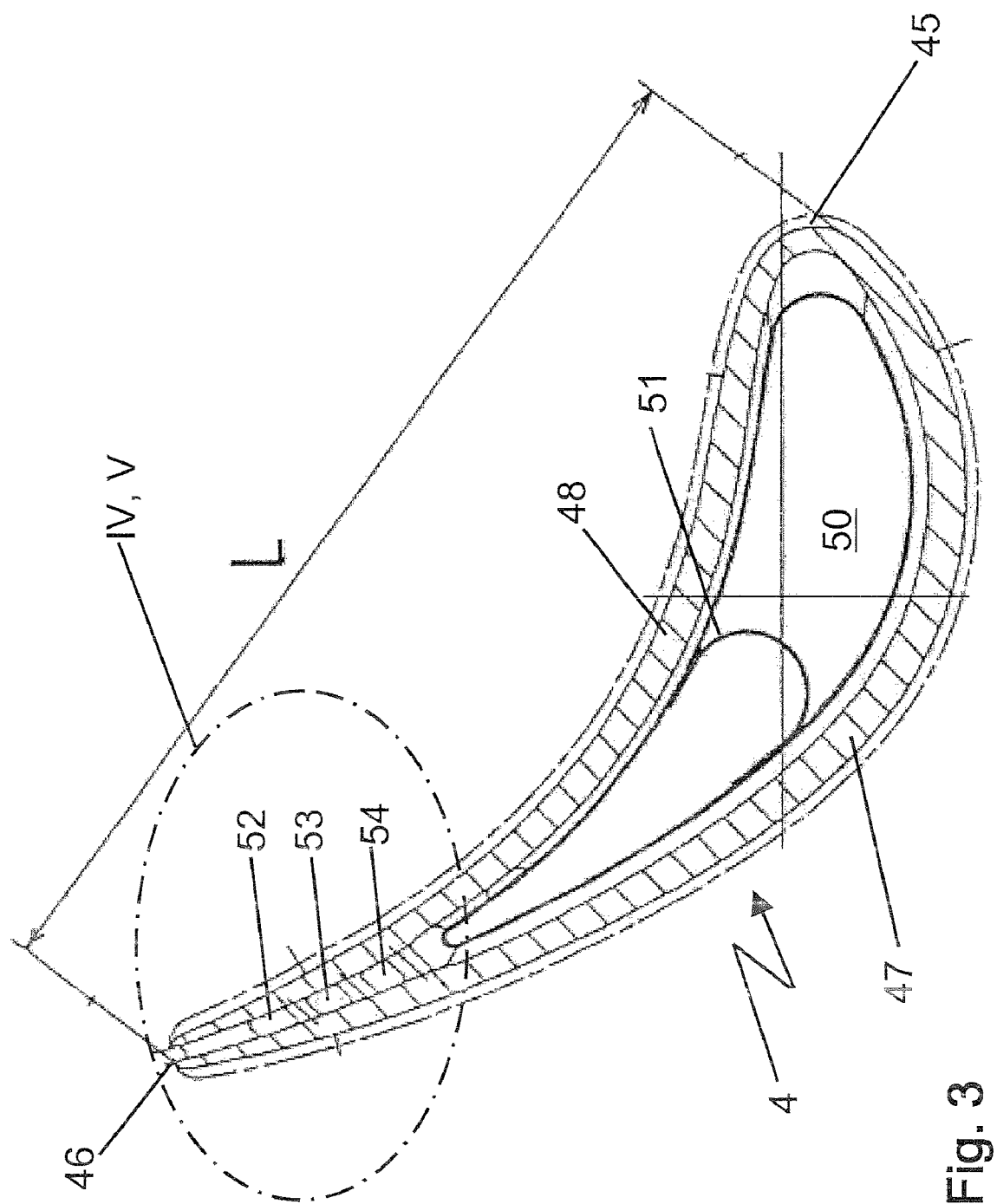
FIG. 3 shows a cross section through the fluid flow machine blade represented in FIG. 1.

FIG. 3 shows a cross section through the airfoil 4 of a fluid flow machine blade according to the invention represented in FIG. 1. In this representation, the wing-like profile of the airfoil 4 can be recognized. The blade contour is here formed by a suction-side wall 47 and a pressure-side wall 48. Between the suction-side wall and the pressure-side wall there is formed inside the airfoil a cavity 50, which is configured for the passage of cooling air. For this purpose, by way of example, flow baffles 51 are indicated. The cavity 50 is open toward the trailing edge 46 of the airfoil such that cooling air can escape through blow-out openings on the trailing edge of the airfoil and thereby cools the trailing edge region of the airfoil. The escaping cooling air reduces, furthermore, the flow wakes on the blade trailing edge and thus improves the aerodynamics of the airfoil. The profile of the airfoil has a chord length L, which is measured from the leading edge 45 to the trailing edge 46 of the airfoil. In the region of the airfoil trailing edge there are disposed webs 52, 53, and 54, which connect the suction-side wall 47 and the pressure-side wall 48 one to the other. These ensure, in the region of the blade trailing edge, an improved mechanical stability. That region of the airfoil which is close to the trailing edge and is identified by the dash-dot line is represented in greater detail in FIGS. 4 and 5 and is described in greater detail below.

The geometry of the webs 52, 53, and 54 is briefly illustrated with reference to FIG. 4. The webs exhibit a distance to the trailing edge 46. A first web 52 is in this case disposed at a first distance f1 to the trailing edge. A second web 53 is disposed at a second distance f2 to the trailing edge. A third web 54 is disposed at a distance f3 to the trailing edge. The represented webs do not by any means have to be arranged in a plane, but can be situated at different positions in the direction of the blade height. According to one embodiment of the invention, the distance by which the thermal barrier coating, viewed in the flow direction, ends upstream of the blade trailing edge is greater than the value f1 and less than the value f2.

FIG. 5 illustrates the geometry of the airfoil trailing edge in greater detail. Ideally, the airfoil tapers to a point at the trailing edge. This geometry is not feasible, however, for a variety of reasons. The blade trailing edge is therefore realized with a trailing edge radius r. In the interest of optimal aerodynamics, this radius should be as small as possible and the blade trailing edge should have the least possible thickness in order to allow the flow losses created by the wake of the airfoil to be minimized. Owing to the blow-out openings on the airfoil trailing edge, the trailing edge radius is interrupted. The airfoil walls 47 and 48, as also the webs, include a blade base material. Generally, these structures are made by casting from a metal alloy. On the airfoil outer contour a bond coat 49 is disposed. On the bond coat there is disposed the thermal barrier coating 41, which is generally a ceramic protective layer, for example $ZrO_2$. Viewed in the direction of circumfluence of the airfoil, the thermal barrier coating ends a distance K upstream of the blade trailing edge. In the region 42 on the airfoil trailing edge which is not covered by the thermal barrier coating, the bond coat 49 acts as an anti-oxidization layer on the metallic wall of the airfoil. In the region directly adjoining the airfoil trailing edge, the airfoil walls are cooled by the outflowing cooling air substantially more intensively than in the regions of the airfoil situated upstream thereof. This effect is compensated for by the fact that the region 42 adjoining the airfoil trailing edge is not covered with the thermal barrier coating, whereby the heat input into the blade base material is also increased. At the same time, through the omission of the thermal barrier coating, the thickness of the airfoil trailing edge is reduced and the aerodynamics of the airfoil thereby improved. A further reduction in flow losses results from the fact that a lesser part of the surface is covered with the generally comparatively rough thermal barrier coating, which results in a reduction in the friction flow losses. For the establishment of the measure K, i.e., the distance by which the thermal barrier coating, viewed in the direction of circumfluence of the airfoil profile, ends upstream of the trailing edge, the following criteria, for example, can be adopted: the distance K is greater than or equal to the distance f1 of the first web 52 from the trailing edge and/or less than or equal to the distance f2 of the second web 53 from the trailing edge. Alternatively, the measure K is determined such that it is greater than or equal to five times the measure of the trailing edge radius and/or less than or equal to eight times the measure of the trailing edge radius. According to a further possible interpretation criterion, the measure K is greater than or equal to 10% of the chord length L and/or less than or equal to 15% of the chord length L. This listing cannot and is not intended to be exhaustive; according to concrete factors, other interpretation criteria may also be sensible. If the reference value used varies over the airfoil height, then the local value can respectively be used to interpret the distance K. On the other hand, the distance K can also readily be dimensioned such that the absolute value remains constant over the airfoil height. In this case, the above-quoted interpretation criteria do not necessarily have to be locally breached.

In the light of the above statements, further embodiments of the invention characterized in the claims will present themselves to the person skilled in the art.

REFERENCE SYMBOL LIST 1 fluid flow machine blade
4 airfoil
21 blade platform, foot-side platform
31 tip platform
41 thermal barrier coating, region coated with thermal barrier coating
42 region without thermal barrier coating on the trailing edge
43 foot-side region without thermal barrier coating
44 tip region without thermal barrier coating
45 airfoil leading edge
46 airfoil trailing edge
47 suction-side wall
48 pressure-side wall
49 bond coat and anti-oxidization layer
50 cavity
51 flow baffle
52 first web
53 second web
54 third web
f1 distance of the first web from the airfoil trailing edge
f2 distance of the second web from the airfoil trailing edge
f3 distance of the third web from the airfoil trailing edge
K distance by which the thermal barrier coating ends upstream of the trailing edge
m1 width of the foot-side region without thermal barrier coating
m2 width of the tip region without thermal barrier coating
r trailing edge radius
r1 transition radius
r2 transition radius
r3 transition radius While the invention has been described in detail with reference to exemplary embodiments thereof, it will be apparent to one skilled in the art that various changes can be made, and equivalents employed, without departing from the scope of the invention. The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

What is claimed is:

1. A fluid flow machine blade comprising:
an airfoil having an airfoil leading edge, an airfoil trailing edge, a suction side, and a pressure side, the airfoil, on an outer side of an airfoil contour which, during operation, is flowed around by hot gas on the suction side and on the pressure side, having a thermal barrier coating;

wherein only first sections of the airfoil have the thermal barrier coating, and second sections lack a thermal barrier coating;

wherein the thermal barrier coating, in the direction of circumfluence running from the airfoil leading edge to the airfoil trailing edge, ends a distance K upstream of the airfoil trailing edge on said suction side and on said pressure side such that an upstream first section of the airfoil has a thermal barrier coating, and a trailing edge region of the airfoil lacks the thermal barrier coating, on both the suction side and on the pressure side; and wherein L is a chord length of the airfoil, and wherein $(0.1 \times L) \leq K \leq (0.15 \times L)$.

2. The fluid flow machine blade as claimed in claim 1, wherein the airfoil trailing edge has a trailing edge radius r; and wherein the distance K is greater than or equal to five times the trailing edge radius r.

3. The fluid flow machine blade as claimed in claim 1, wherein the airfoil trailing edge has a trailing edge radius r; and wherein the distance K is less than or equal to eight times the trailing edge radius r.

4. The fluid flow machine blade as claimed in claim 1, wherein the airfoil contour comprises a pressure-side wall and a suction-side wall, the pressure-side wall and the suction-side wall together enclosing a cavity.

5. The fluid flow machine blade as claimed in claim 4, further comprising: ducts in the cavity configured and arranged for the passage of a cooling fluid.

6. The fluid flow machine blade as claimed in claim 5, wherein the ducts in the cavity are configured and arranged for the passage of cooling air.

7. The fluid flow machine blade as claimed in claim 4, further comprising:

webs, ribs, or both, disposed in the cavity, which connect the suction-side wall and the pressure-side wall.

8. The fluid flow machine blade as claimed in claim 7, wherein, when viewed from the trailing edge of the airfoil, said webs, ribs, or both comprise a first web having a first distance f1 to the airfoil trailing edge; and wherein the distance K is greater than or equal to the first distance f1.

9. The fluid flow machine blade as claimed in claim 7, wherein, when viewed from the trailing edge of the airfoil, said webs, ribs, or both comprise a second web having a second distance f2 to the airfoil trailing edge; and wherein the distance K is less than or equal to the second distance f2.

10. The fluid flow machine blade as claimed in claim 1, further comprising:

a blade foot including a blade platform; and wherein the airfoil, in a region adjoining the blade platform, lacks the thermal barrier coating.

11. The fluid flow machine blade as claimed in claim 10, further comprising:

a transition region from the airfoil to the blade platform having a first transition radius r1 adjoining the blade platform; and wherein the width m1 of the region lacking the thermal barrier coating is greater than the first transition radius r1.

12. The fluid flow machine blade as claimed in claim 1, further comprising:

an anti-oxidization layer covering the region of the airfoil which is not covered by the thermal barrier coating.

13. The fluid flow machine blade as claimed in claim 12, wherein the airfoil comprises a base material, wherein the anti-oxidization layer covers the entire outer airfoil contour and, in regions covered by the thermal barrier coating, is disposed as a bond coat between the base material and the thermal barrier coating.

14. The fluid flow machine blade as claimed in claim 1, further comprising:

a tip platform at the airfoil tip;

wherein the airfoil, in a region adjoining the tip platform, lacks the thermal barrier coating.

15. The fluid flow machine blade as claimed in claim 14, further comprising:

a transition region from the airfoil to the blade platform having a second transition radius r1 adjoining the tip platform; and wherein a width m2 of the region lacking the thermal barrier coating is greater than the second transition radius.

16. A process for manufacturing a fluid flow machine blade, comprising:

manufacturing a blade basic element from a base material, the blade basic element comprising an airfoil having an outer airfoil contour, an airfoil leading edge, an airfoil trailing edge, a suction side, and a pressure side;

applying a thermal barrier coating to the outer airfoil contour of the airfoil, including applying the thermal barrier coating so that, in the direction of circumfluence running from the airfoil leading edge to the airfoil trailing edge, the thermal barrier coating ends a distance K upstream of the airfoil trailing edge on both the suction side and on the pressure side, such that an upstream first section of the airfoil has a thermal barrier coating, and a trailing edge region of the airfoil lacks a thermal barrier coating on both the suction side and on the pressure side, wherein L is a chord length of the airfoil, and wherein $(0.1 \times L) \leq K \leq (0.15 \times L)$.

17. The process as claimed in claim 16, further comprising:

prior to said applying a thermal barrier coating, applying a bond coat to the entire airfoil outer contour.

18. A fluid flow machine blade comprising:

an airfoil having an airfoil leading edge, an airfoil trailing edge, a suction side, and a pressure side, the airfoil, on an outer side of an airfoil contour which, during operation, is flowed around by hot gas on both the suction side and on the pressure side, having a thermal barrier coating;

wherein only first sections of the airfoil have the thermal barrier coating, and second sections lack a thermal barrier coating;

wherein the thermal barrier coating, in the direction of circumfluence running from the airfoil leading edge to the airfoil trailing edge, ends a distance K upstream of the airfoil trailing edge on both the suction side and on the pressure side, such that an upstream first section of the airfoil has a thermal barrier coating, and a trailing edge region of the airfoil lacks a thermal barrier coating on both the suction side and on the pressure side;

wherein the airfoil trailing edge has a trailing edge radius r; and wherein $(5 \times r) \leq K \leq (8 \times r)$.

19. The fluid flow machine blade as claimed in claim 18, wherein the airfoil contour comprises a pressure-side wall and a suction-side wall, the pressure-side wall and the suction-side wall together enclosing a cavity.

20. The fluid flow machine blade as claimed in claim 19, further comprising:

ducts in the cavity configured and arranged for the passage of a cooling fluid.

21. The fluid flow machine blade as claimed in claim 19, further comprising:
    webs, ribs, or both, disposed in the cavity, which connect the suction-side wall and the pressure-side wall.

22. The fluid flow machine blade as claimed in claim 21, wherein, when viewed from the trailing edge of the airfoil, said webs, ribs, or both comprise a first web having a first distance f1 to the airfoil trailing edge; and wherein the distance K is greater than or equal to the first distance f1.

23. The fluid flow machine blade as claimed in claim 21, wherein, when viewed from the trailing edge of the airfoil, said webs, ribs, or both comprise a second web having a second distance f2 to the airfoil trailing edge; and wherein the distance K is less than or equal to the second distance f2.

\* \* \* \* \*